UNITED STATES PATENT OFFICE.

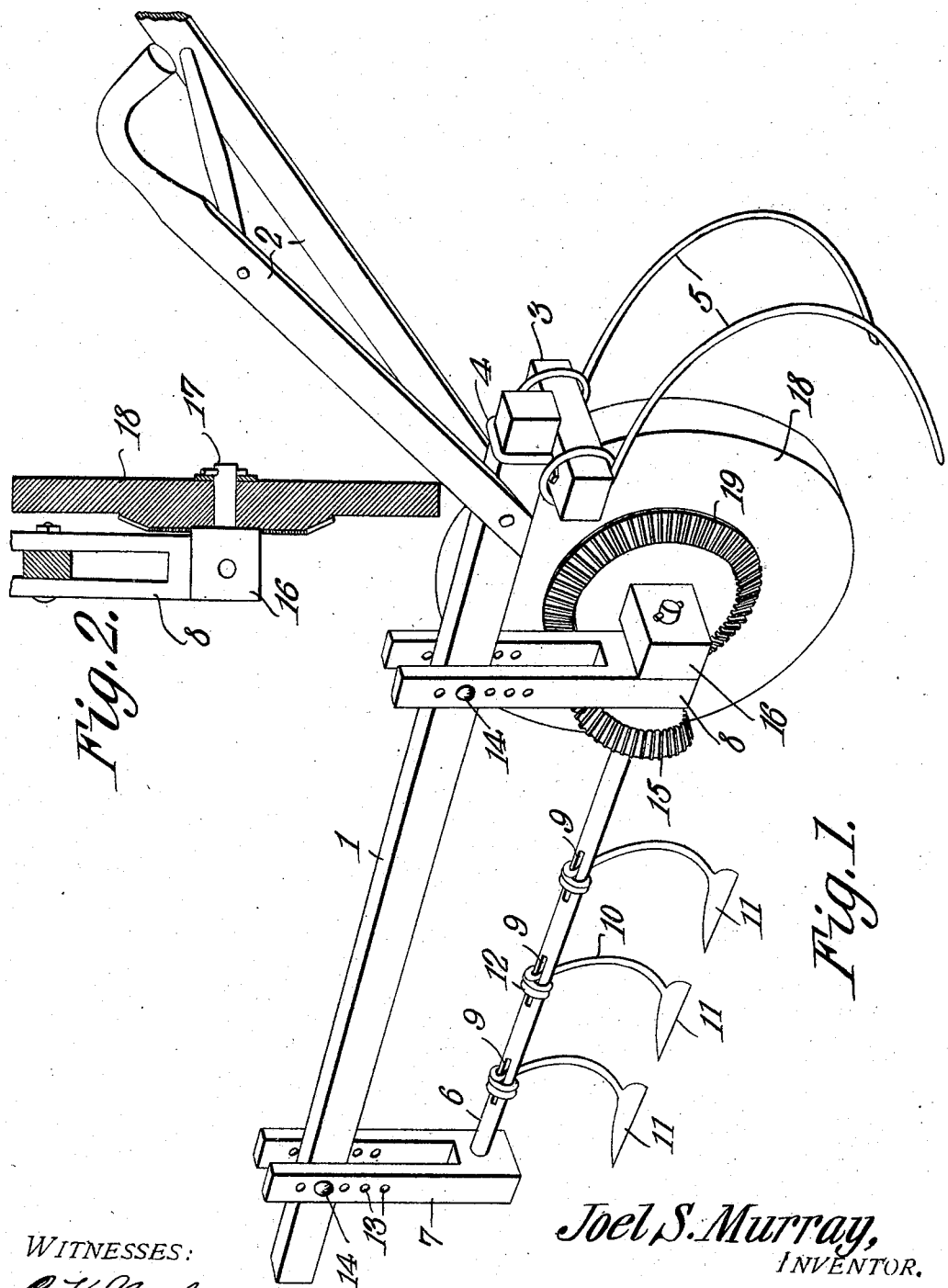

JOEL S. MURRAY, OF BRUSHY CREEK, TEXAS, ASSIGNOR OF ONE-HALF TO EZEM H. SCARBOROUGH, OF BRUSHY CREEK, TEXAS.

COTTON-CHOPPER.

No. 867,397.      Specification of Letters Patent.      Patented Oct. 1, 1907.

Application filed November 27, 1906. Serial No. 345,320.

*To all whom it may concern:*

Be it known that I, JOEL S. MURRAY, a citizen of the United States, residing at Brushy Creek, in the county of Anderson and State of Texas, have invented a new and useful Cotton-Chopper, of which the following is a specification.

This invention has relation to cotton choppers and it consists in the novel construction and arrangement of its parts as hereinafter shown and described.

The object of the invention is to provide a chopper having a rotating shaft upon which is located a series of hoes, said hoes being capable of adjustment along the shaft in order that the intervening space between the blades may be increased or decreased as desired. The shaft is journaled in U-shaped hangers which in turn receive between their upper portions the beam of the implement. Means being provided for adjusting the said hangers vertically with relation to the beam. A beveled gear wheel is fixed to the said shaft which in turn meshes with a beveled gear carried by a ground wheel; said ground wheel in turn is journaled upon a spindle provided on a block which is attached to one of the hangers.

The rear end of the implement is provided with tines the lower ends of which are adapted to work the soil at opposite sides of the row of plants operated upon by the implement.

In the accompanying drawing:—Figure 1 is a perspective view of the cotton chopper, and Fig. 2 is a vertical sectional view through the ground wheel thereof. The chopper comprises the beam 1 to the rear portion of which is attached the handles 2, 2. The block 3 is adjustably secured by means of the inverted U-shaped clamp 4 to the rear portion of the beam 1 behind the point of juncture of the handles 2, 2 therewith. The tines 5, 5 are carried by the block 3 and are adapted to work the soil on the opposite sides of the row of plants upon which the implement is operated. The shaft 6 is journaled in the hangers 7 and 8. Said shaft is provided with a series of elongated openings 9 through which the hoe-shanks 10 pass. Said shanks carry at their free ends the hoe-blades 11, the cutting edges of which extend substantially parallel with the longitudinal axis of the shaft 6. The opposite ends of the hoe-shanks 10 are coiled as at 12 about the periphery of the shaft 6 and afford frictional contact means for retaining the said hoe-shanks 10 at the proper points along the elongated slots 9.

From the foregoing description it is obvious that the said hoe-shanks 10 may be adjusted laterally with relation to each other in order to increase or diminish the intervening space between the hoe-blades 11 in order to meet requirement demanded by conditions of the crop.

The hangers 7 and 8 are U-shaped in side elevation and they receive between their end portions the beam 1. The said end portions of the said hangers are provided with the perforations 13. The bolts 14 are adapted to pass transversely through the end portions of the hangers and the beam 1. Thus the said hangers are attached to the beam and by reasons of the perforations 13 the vertical positions of the hangers with relation to the beam 1 may be adjusted. The beveled gear wheel 15 is fixed to the shaft 6 and is located just within the inner face of the hanger 8. The block 16 is attached to the rear or outer face of the hanger 8. The spindle 17 projects laterally from the side of the block 16 and the ground wheel 18 is journaled upon said spindle 17. The beveled gear is carried by the ground wheel 18 and meshes with the beveled gear wheel 15. It will thus be seen that as the implement is drawn along a row of plants the wheel 18 through the gear 19 and wheel 15 will transmit rotary movement to the shaft 6, which in turn will revolve the hoe-blades 11 and bring the same at the end of each revolution in lateral contact with the row of plants. The blades will pass through the row cutting out such plants as they come in contact with, while those plants that happen to pass through the intervening space between the blades will be left standing. Thus the row is thinned.

By providing the vertically adjustable hangers 7 and 8 the blades 11 may be adjusted to make a shallow or deep cut in the ground. Inasmuch as the ground wheel 18 is journaled to the block 16 which in turn is fixed to the hanger 8 any vertical adjustment of the hangers 7 and 8 with relation to the beam 1 will not effect the intermeshing of the gears 19 and the gear of the wheel 15.

Having described my invention what I claim as new and desire to secure by Letters-Patent is:—

A cotton chopper comprising a beam, hangers supported thereby, a shaft journaled in the hangers and provided with longitudinally-disposed slots, choppers having their shanks longitudinally adjustable in the slots and coiled around the shaft to provide friction-acting clamps to hold the shanks in adjusted positions when the machine is in operation, and means for rotating the shaft.

In testimony that I claim the foregoing as my own, I have hereto affixed my signature in the presence of two witnesses.

JOEL S. MURRAY.

Witnesses:
  C. W. HANKS,
  TUCKER ROYALL.